United States Patent
Mariller et al.

(10) Patent No.: US 6,490,966 B2
(45) Date of Patent: Dec. 10, 2002

(54) METHOD AND DEVICE FOR EXTRACTING THE CONTENTS OF A CAPSULE

(75) Inventors: Alain Mariller, Yvonand (CH); Alfred Yoakim, St. Legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/855,227

(22) Filed: May 15, 2001

(65) Prior Publication Data

US 2002/0002913 A1 Jan. 10, 2002

Related U.S. Application Data (63) Continuation of application No. PCT/EP99/08698, filed on Nov. 9, 1999.

(51) Int. Cl.[7] .................................................. A47J 31/40
(52) U.S. Cl. ...................... 99/289 R; 99/295; 99/302 P
(58) Field of Search ............................. 99/295, 289 R, 99/302 R, 289 T, 302 P, 296, 287

(56) References Cited

U.S. PATENT DOCUMENTS

| | | | |
|---|---|---|---|
| 4,220,259 A | 9/1980 | Lagneaux | 222/82 |
| 4,738,378 A | 4/1988 | Oakley et al. | 222/82 |
| 5,242,702 A | 9/1993 | Fond | 426/433 |
| 5,259,296 A | * 11/1993 | Mikael et al. | 99/289 R X |
| 5,454,293 A | * 10/1995 | Santi | 99/289 R |
| 5,755,149 A | 5/1998 | Blanc et al. | 99/289 |
| 5,776,527 A | 7/1998 | Blanc | 426/77 |
| 5,794,519 A | 8/1998 | Fischer | 99/295 |
| 5,974,949 A | 11/1999 | Weber et al. | 99/289 |

FOREIGN PATENT DOCUMENTS

| | | |
|---|---|---|
| EP | 0 002 987 | 7/1979 |
| EP | 0 468 078 | 1/1992 |
| EP | 0 867 142 | 9/1998 |
| FR | 2 526 652 | 11/1983 |
| WO | WO 95/07041 | 3/1995 |
| WO | WO 95/17121 | 6/1995 |
| WO | WO 96/08990 | 3/1996 |

* cited by examiner

Primary Examiner—Reginald L. Alexander
(74) Attorney, Agent, or Firm—Winston & Strawn (57) ABSTRACT

An extraction system with two independent clamping elements, enclosing between themselves, each for approximately one half, a housing for the capsule. A clamping element is connected to the extraction system and on either side of the the extraction system, allowing the extraction system to be pivoted from the position away from the vertical plane to the vertical position and to be closed and opened. A lever system is connected to the clamping elements, enabling the user to work the the elements. The extraction system, the clamping elements, and the lever system preferably work together on a machine-supporting frame. The device also can include a mobile water inlet system above the system for the extraction of the contents of the capsule between the two clamping elements.

29 Claims, 5 Drawing Sheets

METHOD AND DEVICE FOR EXTRACTING THE CONTENTS OF A CAPSULE

CROSS-REFERENCE TO RELATED APPLICATIONS

This is a continuation of International Application No. PCT/EP99/08698, filed Nov. 9, 1999, the content of which is expressly incorporated herein by reference thereto.

FIELD OF THE INVENTION

The present invention relates to a method for extracting the contents of a capsule that has a plane of symmetry. The invention also relates to a device for implementing the method.

BACKGROUND OF THE INVENTION

It is prior art to extract the contents of a closed cartridge. Patent EP 242,556 relates to a device for the preparation of a drink by extracting the contents of a cartridge placed in a cartridge holder for a coffee machine. The drawback with this device is that it comprises a water-injecting member which is a pointed member, and which consequently pierces the cartridge. This piercing of the cartridge is no longer desired, partly because it necessitates the presence of an expensive pointed member, and partly because it causes coffee grounds to move back up the said pointed member.

SUMMARY OF THE INVENTION

The object of the present invention is to develop a method and a device in which water can be supplied to extract the contents of a capsule, without tearing the said capsule, in the case of a sealed capsule. The invention also can be used to extract the contents of an open capsule.

The present invention relates to a method for extracting the contents of a capsule that has a plane of symmetry, in which the said capsule is placed in the housing of an extraction system consisting of two clamping elements that enclose between themselves, each for approximately one half, the said housing, in such a way that it is positioned in the system in a plane away from the vertical plane, the said capsule is moved into a vertical plane, in such a way that it is imprisoned leaktightly in the said system, and in such a way that a liquid inlet arrives over the top of the said capsule, and the contents of the said capsule are extracted and the coffee flows out from the bottom of the said capsule.

It is possible in accordance with the invention to extract the contents of both open and sealed capsules. As regards an open capsule, this refers to a plastic capsule or sachets of filter paper and nonwovens. The contents of the capsule are a powdery substance for the preparation of a drink, selected from roasted and ground coffee, tea, instant coffee, a mixture of instant and ground coffees, a hot chocolate product or any other dried substance suitable for consumption.

In the case of sealed capsules, it is possible to extract the contents of the capsule forming the subject-matter of patent application PCT/EP98/03826, namely a sealed flexible sachet in the form of an individual portion designed to be extracted under pressure and containing roasted and ground coffee, the sachet consisting of two identical flexible sheets or a single folded flexible sheet of circular, oval or polygonal form enclosing between the two sheets or between the two faces of the folded sheet a space for the coffee and the two sheets or the two faces of the folded sheet are stuck together around their perimeter in such a way that the said sachet is essentially symmetrical about its joining plane, and the sachet is opened merely by the increase in pressure occasioned by the injection of the extracting fluid, in which the two flexible sheets or the two faces of the folded sheet are extended on one side of the said sachet beyond their join line in order to form between the said sheets or between the two faces of the folded sheet a channel through which the extracting fluid can be introduced, the said channel being approximately perpendicular to the join line to which it leads. The method is not however limited to this kind of capsule and can be used on any capsule with a plane of symmetry and in which the sheets forming the capsule are sealed.

In the method of the invention, the extracting fluid is raised to a pressure sufficient to unseal the two sealed sheets at the point where the said fluid arrives. In practice, the two clamping elements must grip the capsule adequately if the capsule is to resist the increase in pressure during extraction and must provide a good seal around the point where the extracting fluid arrives. The contents of the capsule are normally extracted at a pressure of between 2 and 10 bar, preferably of about 6 to 8 bar on raised and hollow portions situated on at least one of the faces of the clamping elements.

For satisfactory extraction of the coffee from the capsule, a certain amount of time is required for the extraction. However, neither should the extraction take too long, as the consumer wants to keep within the times required for the extraction of conventional espresso coffees. The method according to the invention will normally extract 250 to 300 $cm^3$ per minute.

The advantage of having a method whereby the capsule whose contents are to be extracted is placed in a housing on a plane away from the vertical plane is that in this case the consumer no longer has to hold the capsule holder and engage it in clamping bars. The consumer has merely to place the capsule whose contents are to be extracted in the housing and close the extraction system: this therefore eliminates all risk of disturbance, wrong positioning and the like.

The invention also relates to the device for implementing the method described above. In one embodiment, the device comprises:

- an extraction system consisting of two independent and identical clamping elements, enclosing between themselves, each for approximately one half, a housing for the capsule,
- clamping means connected to the extraction system and on either side of the said extraction system and allowing the said extraction system to be pivoted from the position away from the vertical plane to the vertical position and closed and opened, and
- a lever system connected to the said clamping means mentioned above and enabling the user to work the said means,
- the extraction system, the clamping means and the lever system working together on a machine supporting frame and the device also comprising a mobile water inlet system above the system for the extraction of the contents of the capsule between the two clamping elements.

The two clamping elements have seals around the edge of the housing to ensure that the capsule whose contents are to be extracted is gripped firmly. The clamping means must allow a move from the inclined position of the extraction system to the vertical position, while also allowing the two clamping elements to come satisfactorily together, both in order to hold the said capsule properly and to prevent leaks (leaks are especially to be avoided in order that during extraction the seal between each face of the said capsule does not give). The lever allows the user to open and close the extraction system. The result is that the consumer has a very simple task to perform, namely to insert the selected capsule and pull the lever forwards, as explained in greater detail below.

Clearly, when the lever is pulled forwards for extraction, the water inlet must come down at the same time to the top of the extraction system. The water inlet pipe does not need to be fitted with a needle: it is only necessary that the pipe is so positioned that leaks cannot occur, and it is only the pressure of the water that forces its way through the seal of the capsule at the point where the water arrives.

It is possible according to the invention to provide a housing for the capsule of variable size. This means that the capsules for one cup or capsules for two cups can be used, with a mobile water inlet system that adapts itself accordingly.

In the case of a sealed capsule, during extraction, that is when the hot water is entering the capsule, there is a pressure increase inside the said capsule: to produce an opening, there must be raised and hollow portions present in the clamping elements so that a tension sufficient to rupture the material forming the capsule is built up against the said raised and hollow portions. It may be envisaged that one or both of the clamping elements contains raised and hollow portions.

The clamping means that are useable in accordance with the invention may be variously constructed. In one particular embodiment, these clamping means consist of

- a clamping rod connected at one end to one of the two clamping elements, halfway along the length of the said element,
- an L-shaped clamping lever that is connected at its mid-point to the other end of the clamping rod, is connected to the second clamping element also halfway along the said element and is connected to a master rod, and
- a master rod, one end of which slides in a guide at the bottom of the supporting frame on a positioning pin, the other end being connected to the lever system.

In a second embodiment, the device according to the invention comprises:

- an extraction system consisting of two independent clamping elements, enclosing between themselves, each for approximately one half, a housing for the capsule, the first clamping element comprising on either side perpendicularly and in the middle of the said element an arm with a translational guide and at the end of the said arm a guide pin and the second element comprising on either side and in the middle of the said element a clamping pin,
- clamping means connected to the extraction system and on either side of the said extraction system and allowing the said extraction system to be pivoted from the position away from the vertical plane to the vertical position and closed and opened, and
- a lever with two sides extending from the operating bar of the said lever, the latter being connected to the said clamping means mentioned above and enabling the user to work the said means,
- the extraction system, the clamping means and the lever working together on a machine supporting frame and the device also comprising a fixed water inlet system above the system for the extraction of the contents of the capsule between the two clamping elements.

As in the first embodiment, the two clamping elements have seals around the edge of the housing to ensure that the capsule whose contents are to be extracted is gripped firmly. The clamping means must allow a move from the inclined position of the extraction system to the vertical position, while also allowing the two clamping elements to come satisfactorily together, both in order to hold the said capsule properly and to prevent leaks (leaks are especially to be avoided in order that during extraction the seal between each face of the said capsule does not give). The lever allows the user to open and close the extraction system. The result is that the consumer has a very simple task to perform, namely to insert the selected capsule and pull the lever forwards, as explained in greater detail below.

When the lever is pulled forwards, at the time of the extraction, the extraction system moves up towards the fixed water inlet system. The consumer places the selected capsule between the two elements of the extraction system and draws the lever forwards, which imparts a translational movement of the first clamping element and then concomitantly an upward movement of both clamping elements towards the fixed water inlet system.

In this embodiment the clamping means are simpler than in the first embodiment. They consist of a master rod, on either side of the lever system and connected at one end to the end of the arm of the said lever and at the other end to a translational and clamping pin of the first clamping element which is situated approximately in the middle of the said first clamping element, the supporting frame of the machine comprising on either side

- a translational and clamping guide for the said translational and clamping pin,
- a guide for the guide pin of the first clamping element and
- a clamping guide for the clamping pin of the second element.

The operation of the device will be explained in greater detail in relation to FIGS. 6 to 9. Each side of the lever forms an elbow with first and second arms, the angle of the elbow is between 100 and 140° and the axis of rotation of the said lever is at the intersection of the first and second arms and situated above the supporting frame of the machine. If the device is considered in the closed position, the axis of rotation of the said lever is approximately in the plane of contact between the two clamping elements of the extraction system. The guide for the guide pin of the first clamping element forms an angle of between 0 and 50° with the horizontal plane.

The first arm of the lever must be long enough to allow the user to operate the movement of rotation of the said lever without interfering with the rest of the machine, that is with the supporting frame of the said machine. This first arm is normally between 8 and 15 cm long. The second arm of the lever is between 20 and 40 mm long.

The first clamping element has a translational and clamping pin which engages as indicated above with a translational and clamping guide. This guide forms an elbow having an angle of between 100 and 150°.

As in the first embodiment of the device according to the invention, this second device can be used for open capsules as well as for sealed capsules. In the case of sealed capsules, one or both of the clamping elements comprises raised and hollow portions.

BRIEF DESCRIPTION OF THE DRAWINGS

The two embodiments of the device according to the invention are explained in further detail with reference to the drawings, in which.

DETAILED DESCRIPTION OF THE PREFERRED EMBODIMENTS

FIGS. 1 to 4 show in fact for one embodiment of the device according to the invention the complete sequence of extraction of the contents of a sealed capsule (which is not shown). The water inlet is shown, but upstream is the entire water heating unit (not shown) by means of which the water reaches the selected capsule at the desired temperature.

The device according to the invention comprises a machine supporting frame (1) on which the entire extraction mechanism rests. The latter comprises: the extraction system (2), consisting of two independent and identical clamping or closing elements (3, 4), each enclosing one half of a housing (5, 6) and interior cavity for the capsule; the clamping means (7); and the lever system (8).

The clamping means (7) shown in the figures comprises a linkage and has on either side of the clamping elements (3, 4):
- a clamping rod (9) connected at one end (12) to the clamping element (4), halfway along the length of the said element,
- an L-shaped clamping lever (10) that is connected at its mid-point (11) to the other end (13) of the clamping rod (9), is connected about the pivot (14) to the second clamping element (3), also halfway along the said element, and lastly is connected by the pivot (15) to a master rod (16) and
- a master rod (16), of which one end slides on a positioning pin (17) in a guide (18) at the bottom of the supporting frame (1), while the other end is connected about a pivot (19) to the lever system (8).

The master rod (16) also includes a working guide (20) in which there slides the pivot (15) of the clamping lever (10) during the opening or closing of the clamping elements. The lever (8) rotates on the supporting frame (1) of the machine about a pivot (21).

Lastly, the device includes a mobile water inlet system (22).

Figure 1:
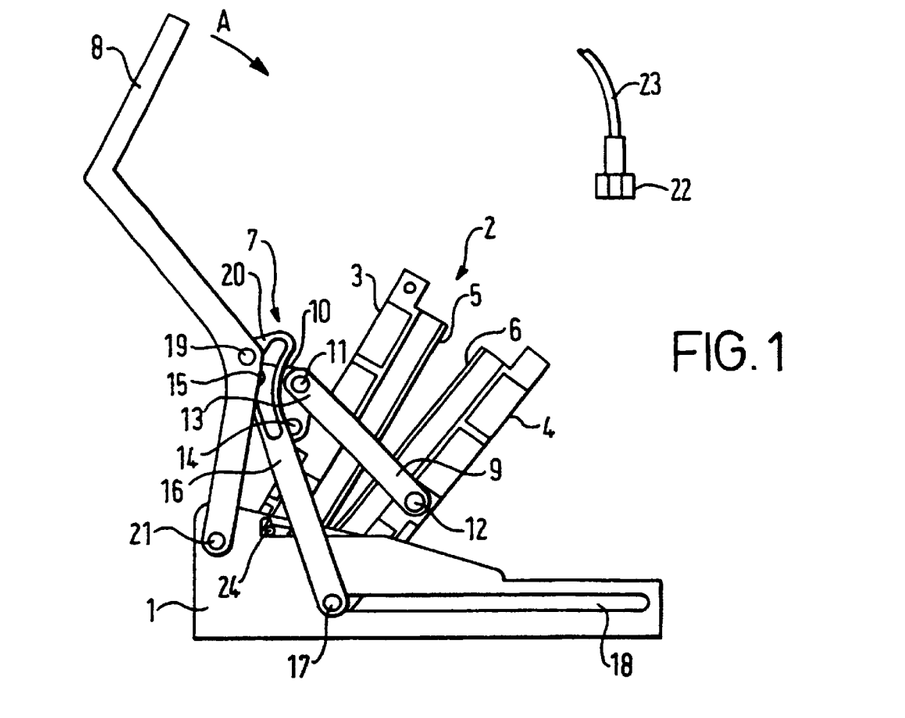
FIG. 1 is a diagrammatic side view of the device according to the invention in the open position, in a first embodiment.

The device according to the invention works as follows: the device is in the open position as shown in FIG. 1. The capsule whose contents are to be extracted is inserted between the two clamping elements (3, 4) and positions itself in the corresponding housings (5, 6). The consumer then pulls the lever (8) in the direction of arrow A to arrive at the closed position shown in FIG. 2. The pivoting of the lever (8) works the master rod (16), and the positioning pin (17) moves along the guide (18) at the bottom of the supporting frame. The clamping lever (10) is simultaneously driven by the pivot (15), the effect of which is to move the clamping rod (9) also.

Figure 2:
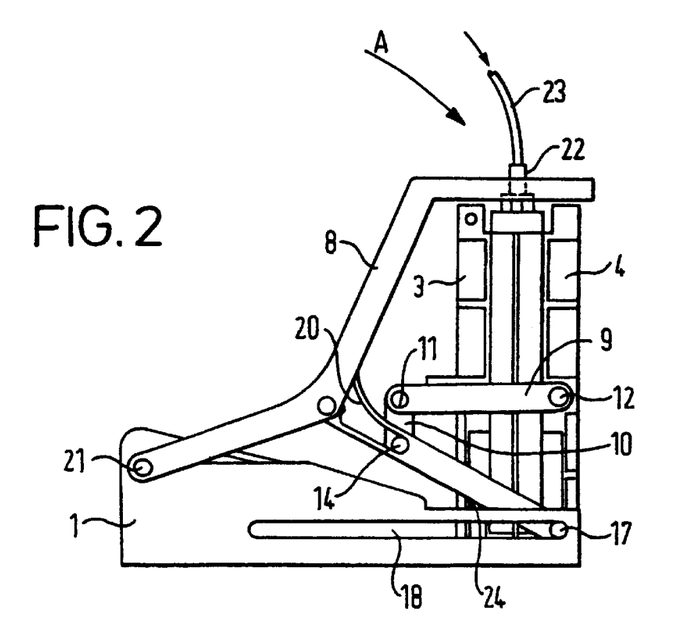
FIG. 2 is a diagrammatic view of the device shown in FIG. 1 in the closed position.

The movement of the lever (8) thus has two effects. The clamping means (7) —which consist of the clamping rod (9), the clamping lever (10) and the master rod (16) moved by the lever (8)—enable on the one hand a straightening up from the inclined position to the vertical position of the two clamping elements (3, 4) and a translational movement of these two elements towards the end of the guide (18). The configuration also means that the two clamping elements (3, 4) eventually engage to prevent leaks from the system. This result is fully achieved when the positioning pin (17) is at the extreme end of the guide (18) and when the L-shaped clamping lever (10) has one arm vertical and the other arm horizontal, when the device according to the invention is considered on a horizontal plane, which is normally the case.

Simultaneously, when the machine is closed, the water inlet system (22) comes down and positions itself centrally between the two clamping elements (3, 4). It is important also that this movement is accompanied by good leaktightness at this point.

The device is now ready to extract the contents of the capsule. The hot water arrives via the pipe (23), into a fluid port formed between the clamping elements, and the pressure of the water unseals the opening of the capsule. The rise in pressure in the said capsule allows extraction to take place through the opening against the raised and hollow portions. The coffee is collected in a cup (not shown) placed underneath the two clamping elements (3, 4) of FIG. 2. Extraction normally takes about one minute. In the figures, the angle of inclination of the clamping elements is about 30°.

Figure 3:
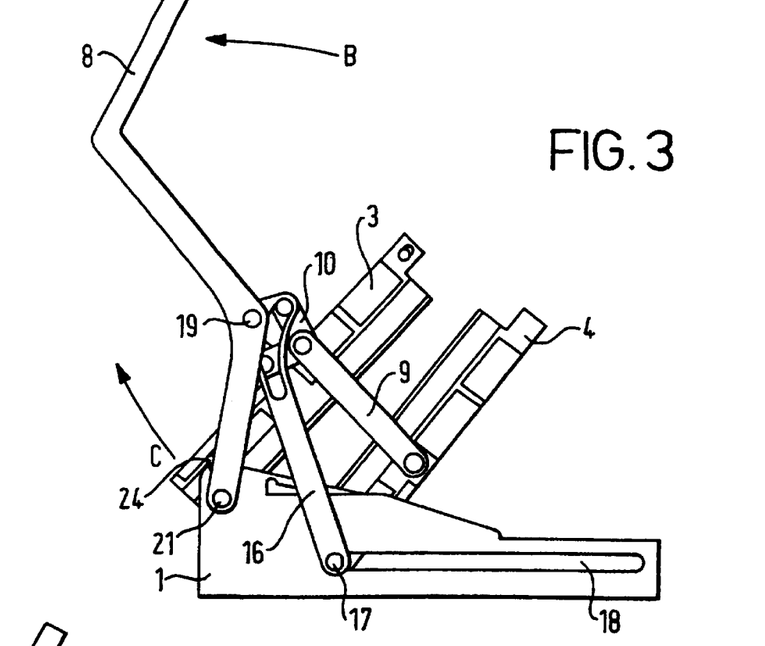
FIG. 3 is a diagrammatic view of the device shown in FIG. 1, during the opening phase, after extraction.
Figure 4:
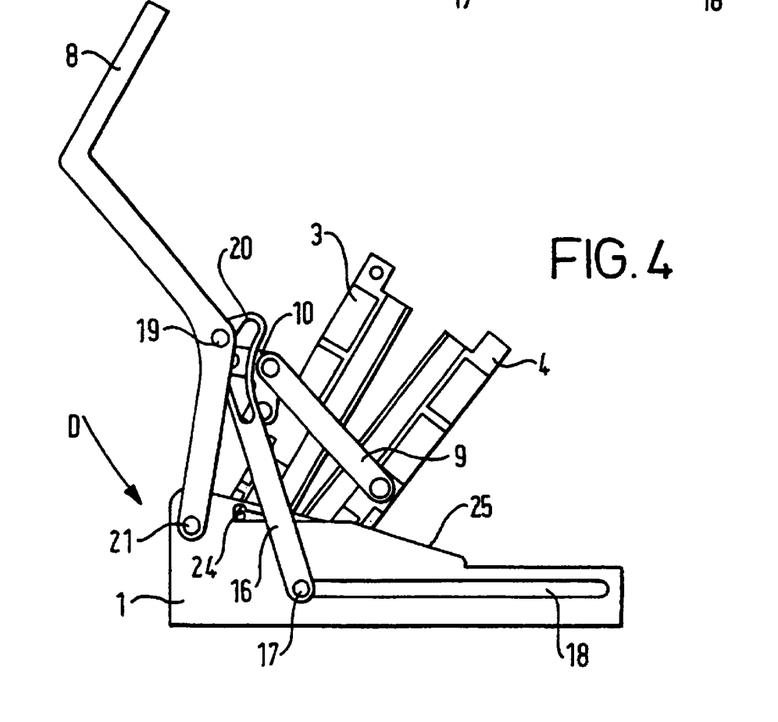
FIG. 4 is a diagrammatic view of the device shown in FIG. 1 at the end of the opening phase and FIG. 5 is a diagrammatic view of the device shown in FIG. 1 showing more specifically the ejection pin.

After extraction, the movement shown in FIG. 3 is carried out, that is to say the consumer shifts the lever (8) in the direction of arrow B, which has the effect of opening the two clamping elements (3, 4). They open because the lever (8) works the master rod (16), and this also has the effect of working the clamping lever (10) and the clamping rod (9). The device is now open.

Figure 5:
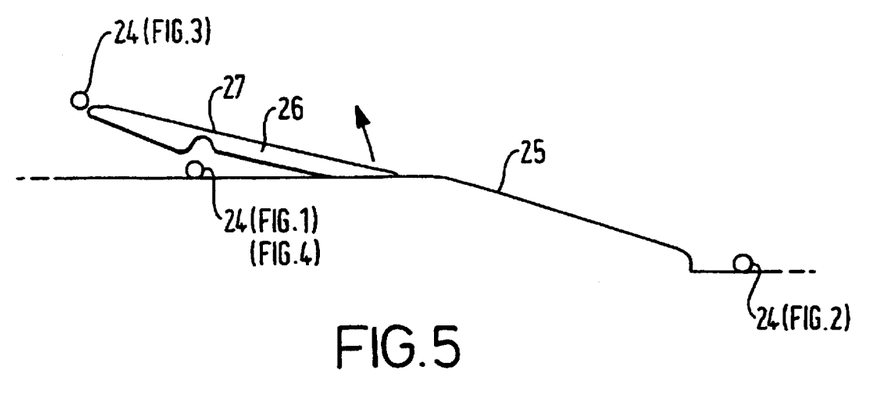

The device also includes a capsule ejecting pin (24) This ejection pin is attached to the bottom of the clamping element (3). In passing from FIG. 1 to FIG. 2, this pin follows the edge (25) of the supporting frame (1) and pushes the snap-action element (26) up until it finally reaches its closed position. FIG. 5 shows clearly the path of this ejection pin. When extraction is completed the system is opened, which raises the ejection pin (24): it travels up along the edge (25) and then along the edge (27) of the snap-action element. When it reaches the end of the edge (27) the device is in the position shown in FIG. 3, i.e. the clamping element (3) is slightly tilted in the direction of arrow C, thus allowing automatic release of the used capsule. The ejection pin (24) then drops down so that the clamping element (3) tilts in the direction of arrow D and returns the assembly to the position shown in FIG. 4 where the device is now ready to extract the contents of another capsule.

FIGS. 6 to 9 illustrate the device according to the invention in its second embodiment. It comprises a supporting frame (30) on which are mounted the extraction system consisting of a first clamping element (31) and a second (32), the clamping means (33) (formed by a master rod) and the lever (34) (consisting of two sides (35, 36) with a bar (37) for operating the said lever). These are the moving parts of the device according to the invention. The lever is rotatable on the supporting frame about the pivot (38) and is connected at (39) to one end of the master rod (33). The other end of the rod (33) is connected to a pivot (40) for the translational movement and clamping of the first clamping element (31). Each side of the lever (34) comprises a first arm (50) and a second arm (51): these two arms form an elbow with an angle of 110°. The first arm is 10 cm long and the second arm 3 cm long. The operating bar is 10 cm wide.

Figure 7:
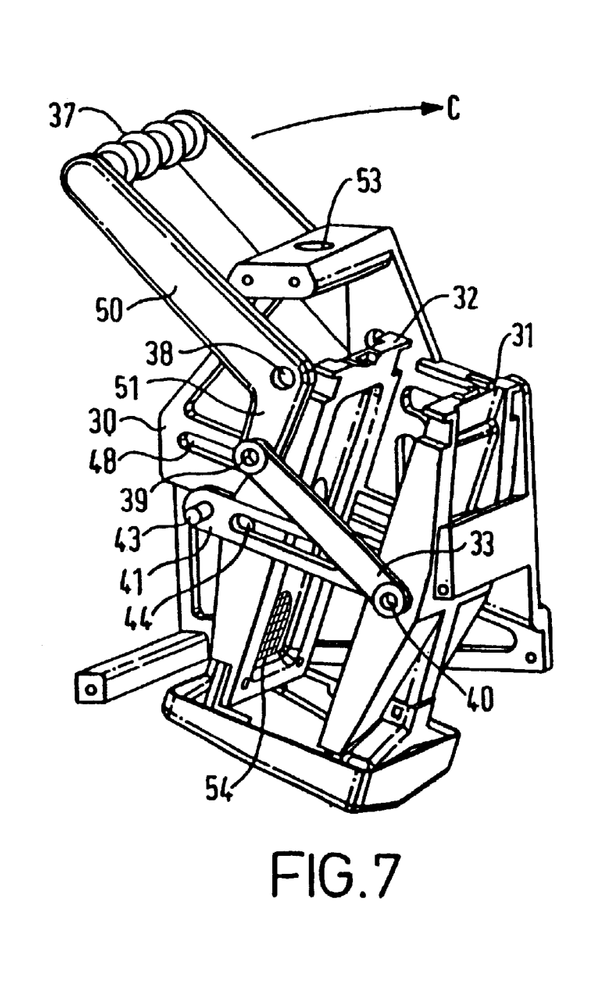
FIGS. 7, 8 and 9 are perspective illustrations of the device shown in FIG. 6 in the open, half-open and closed positions.
Figure 8:
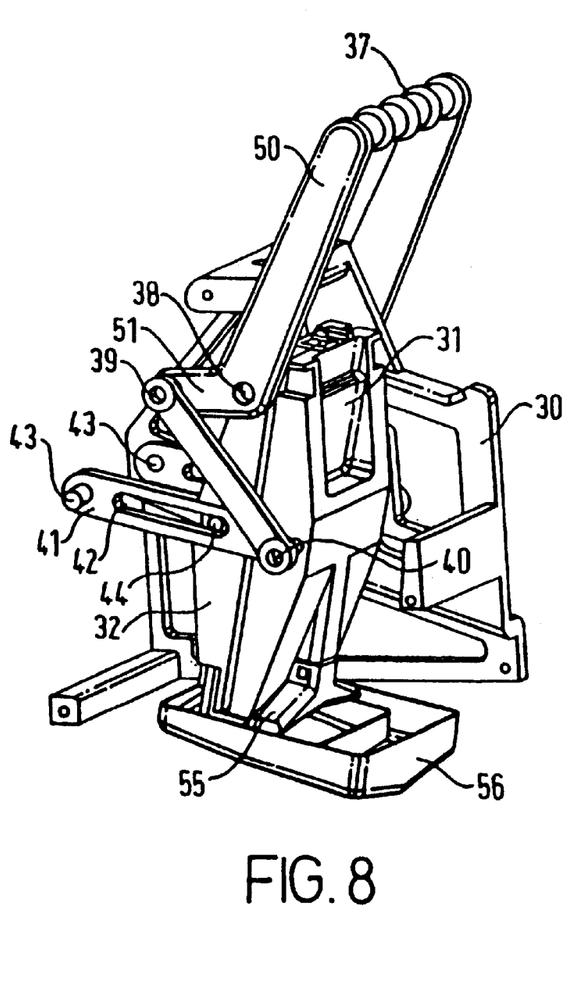
Figure 9:
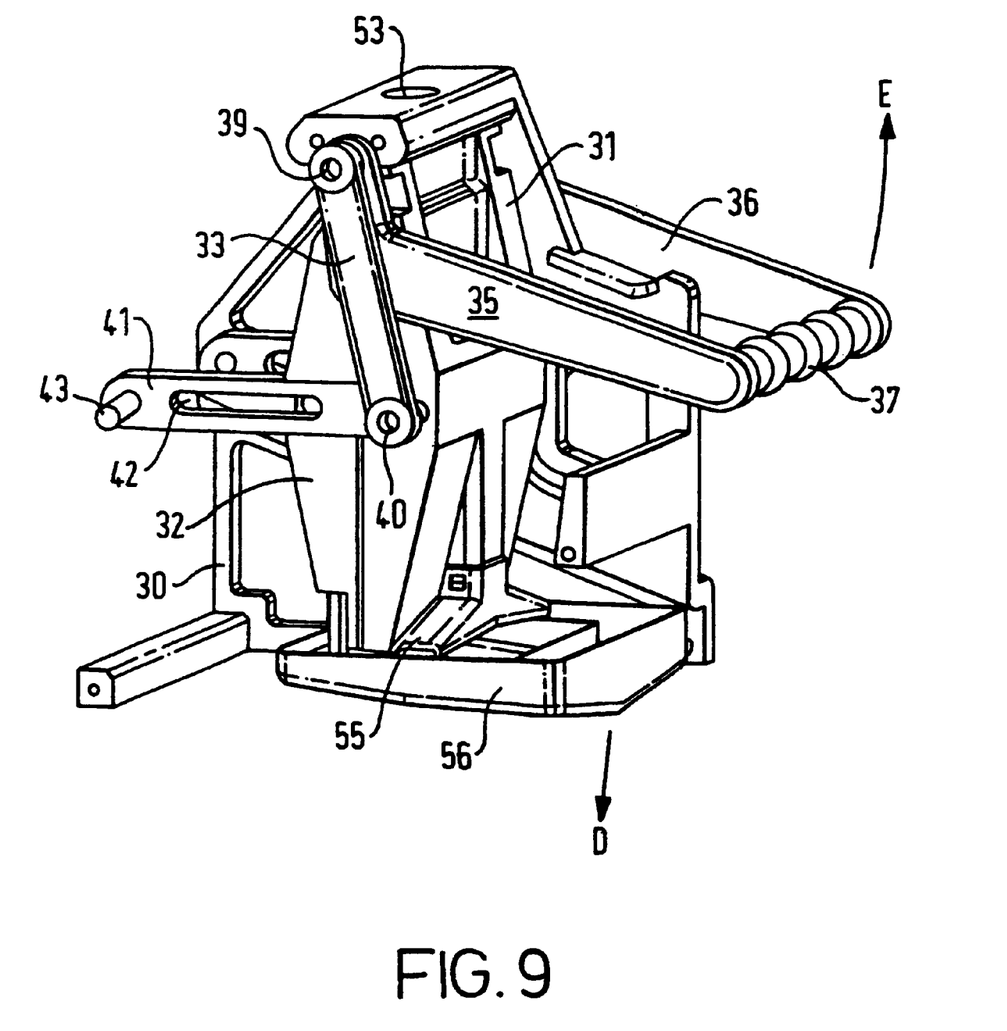

In FIGS. 7 to 9 the front part of the supporting frame has been removed to show the various parts of the device according to the invention. Thus the first clamping element (31) can be clearly seen to comprise on either side and in the middle of the said element an arm (41) with a translational guide (42) and at the end of the said arm a guide pin (43). The second clamping element comprises on either side and in the middle of the said element a clamping pin (44) designed to slide in the above mentioned guide (42).

Figure 6:
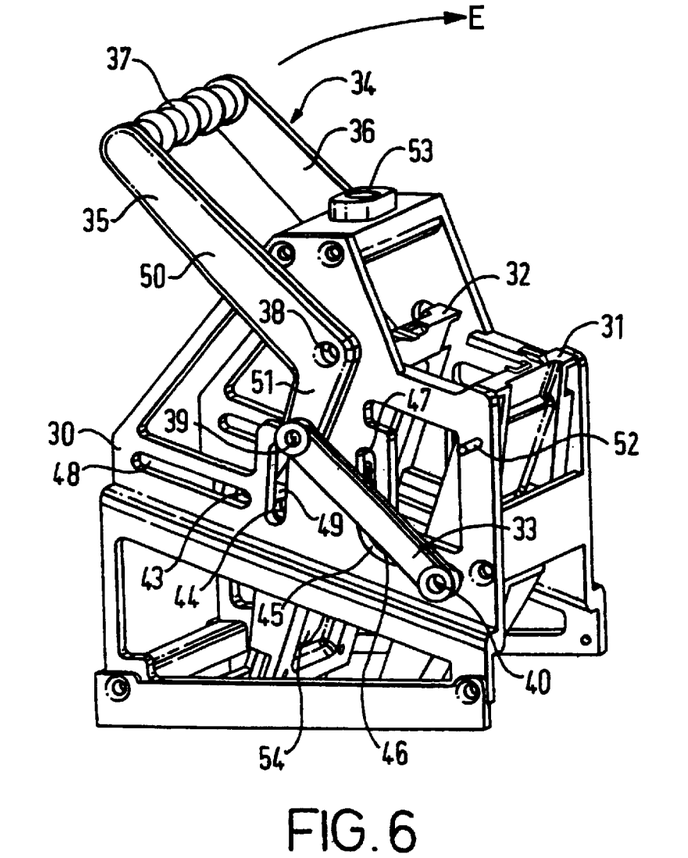
FIG. 6 is a perspective illustration of the device according to the invention in the open position.

In FIG. 6 the 3 other guides can be clearly seen on the supporting frame. The translational and clamping guide (45) comprises the translational guide part (46) and the clamping guide part (47): normally, the angle between these two parts is between 90 and 120°. This guide is intended for the translational and clamping pin (40) of the first clamping element (31). Then there is the guide (48) for the guide pin (43) of the first clamping element (31). Lastly there is the clamping guide (49) in which the clamping pin (44) of the second clamping element (32) slides. As will be seen below, the clamping pin (44) slides both in the translational guide (42) and in the clamping guide (49). There is also a stop (52) for the lever (34) and affixed water inlet system (53).

The embodiment shown in the figures has the clamping elements (31, 32) comprising raised and hallow portions (54). That is, in this case the device is intended for extracting the contents of sealed capsules (not shown).

Operation is as follows: FIGS. 6 and 7 show the device in the open position. The consumer places the capsule between the clamping elements (31, 32) and pulls the lever (34) in the direction of arrow E. The arm (51) of the lever pulls the master rod (33) and hence the first clamping element (31) in a movement of translation. The second element remains immobile during this first phase. The pin (40) slides along the guide (45) and the guide pin (43) of the arm (41) slides along the guide (48). At the point when the lever has been pulled as far as the elbow of the guide (45), the phase of the clamping of the two elements (31, 32) begins. From this point attention should be turned to the translational and clamping pins (40) of the element (31) and the clamping pin (44) of the second clamping element (32). The element (31) can be said to have a phase of translation and clamping, while the element (32) has a phase of clamping only. In this second phase of clamping, the element (31) rises as a result of the pin (40) sliding in the guide part (47) and the element (32) rises while pivoting about the guide pin (43) owing to the sliding of the pin (44) in the clamping guide (49). FIG. 9 shows the final locking of the device. For completely safe closing, the axis of rotation (38) of the lever must be behind the line formed by the pins (39, 40) of the master rod (33), in the overcenter position shown. And finally, in order for the elements (31, 32) to clamp effectively, the guide (49) and the guide part (47) must not be exactly parallel: their directions must come together in the upward direction.

The device is thus ready to extract the contents of the capsule. The hot water arrives via the fixed water inlet system (53) and the pressure of the water unseals the opening of the capsule. The rise in pressure in the said capsule makes extraction possible through the opening against the raised and hollow portions.

A part (55) can then be provided at the outlet of the device for the coffee to flow out into a channel (56) and a cup is placed where indicated by arrow D. As for the previous embodiment, extraction takes around about a minute.

After extraction, the lever is pulled, in the direction of arrow E to separate the elements (31, 32). Another extraction can then be carried out.

What is claimed is:

1. A device for extracting the contents of a capsule, comprising:
    first and second opposing clamping elements movably connected with each other for movement between open and closed positions, wherein:
        in the open position the first clamping elements defines an opening that is open about an opening axis that is substantially displaced from the horizontal, and the clamping elements are configured and disposed for receiving the capsule therebetween, and
        in the closed position the opening axis is disposed closer to the horizontal than in the open position and opening of the first clamping elements is positioned facing the second clamping element to define an interior cavity between the clamping elements, the clamping elements being configured to cooperatively clamp the capsule in the interior cavity; and
    a fluid port associated with the clamping members and in fluid communication with the interior cavity for receiving fluid into the interior cavity in the closed position.

2. The device of claim 1, wherein the upright orientation is substantially vertical.

3. The device of claim 1, further comprising a support frame in supportive association with the clamping elements, wherein the clamping elements are each movable with respect to the frame between the open and closed positions.

4. The device of claim 1, wherein the clamping elements comprise mating faces, which in the closed position are mated together along a mating surface extending substantially upright.

5. The device of claim 1, wherein the clamping elements comprise a seal disposed around the interior cavity and configured and disposed for sealing the interior cavity against leaks of the fluid between the clamping elements in the closed position.

6. The device of claim 5, wherein the seal is configured and disposed for firmly gripping the capsule in the interior cavity in the closed position.

7. The device of claim 1, wherein the at least one of the clamping elements is pivotable about an axis that is movable with respect to the other of the clamping elements.

8. The device of claim 1, wherein the clamping element substantially displaced from the vertical in the open position is inclined from the vertical by an inclination angle of between about 15° to 45°.

9. The device of claim 1, wherein the capsule has a plane of symmetry, and the clamping elements are configured for enclosing the interior cavity with each clamping element enclosing about half of the capsule disposed therein.

10. The device of claim 1, wherein at least one of the clamping elements comprises a raised hollow portion configured for rupturing the capsule thereagainst upon pressurization of the capsule within the interior cavity and for extracting, the contents of the ruptured capsule therethrough.

11. The device of claim 1, further comprising a fluid inlet fluidly communicated with the fluid port in the closed position, the fluid inlet and port being configured for feeding pressurized fluid into the capsule in the interior cavity.

12. The device of claim 11, wherein at least one of the clamping elements comprises a raised hollow portion configured for rupturing the capsule thereagainst and extracting the contents of the ruptured capsule therethrough upon pressurization of the capsule within the interior cavity by the feeding of the pressurized fluid.

13. The device of claim 11, wherein the fluid comprises water.

14. The device of claim 11, wherein the fluid port and fluid inlet are configured for feeding the pressurized fluid at a sufficient pressure for feeding the fluid into the capsule without piercing the capsule.

15. The device of claim 11, wherein the device and clamping elements are configured for gripping the capsule sufficiently to resist separation of a seal between faces of the capsule upon feeding the pressurized fluid into the capsule.

16. The device of claim 1, wherein the fluid port is disposed near the top of the clamping elements in the closed position.

17. A device for extracting the contents of a capsule, comprising:

first and second opposing clamping elements movably connected with each other for movement between open and closed positions, wherein:
  in the open position at least one of the clamping elements is substantially displaced from the vertical, and the clamping elements are configured and disposed for receiving the capsule therebetween in an inclined orientation substantially displaced from the vertical, and
  in the closed position the clamps elements define an interior cavity therebetween and are configured to cooperatively clamp the capsule between the opposing clamping elements in the interior cavity in an upright orientation that is substantially closer to the vertical than the inclined orientation;
a fluid port associated with the clamping members and in fluid communication with the interior cavity for receiving fluid into the interior cavity in the closed position;
a support frame in supportive association with the clamping elements, wherein the clamping elements are each movable with respect to the frame between the open and closed positions; and
a clamping actuator with an actuation linkage having a plurality of links that comprises:
  the frame,
  a first link pivotally connected to the first clamping element and operatively connected to the frame, and
  a second link operatively connected to the second clamping element, to the first link, and to the frame.

18. The device of claim 17, wherein the frame defines a guide in guiding engagement with one of the first and second links for guiding the movement of said one of the links.

19. A device for extracting the contents of a capsule, comprising:

first and second opposing clamping elements movably connected with each other for movement between open and closed positions, wherein:
  in the open position at least one of the clamping elements has a first orientation with respect to the vertical, and the clamping elements are configured and disposed for receiving the capsule therebetween in an orientation corresponding to the first orientation of the one of the clamping elements, and
  in the closed position the clamping elements define an interior cavity therebetween and are configured to cooperatively clamp the capsule between the opposing clamping elements in the interior cavity in another orientation with respect to the vertical;
a fluid port associated with the clamping members and in fluid communication with the interior cavity for receiving fluid into the interior cavity in the closed position; and
a clamping actuator operatively connecting the first and second clamping elements for moving the clamping elements between the open and closed positions, wherein the actuator comprises a linkage operatively connecting the first and second clamping elements for moving the clamping elements between the open and closed positions, the linkage having an overcenter position for mechanically locking the clamping elements in the closed position.

20. The device of claim 19, wherein the actuator comprises a manipulable portion movable with respect to each of the clamping elements and disposed for manipulation and operation by a user for moving the clamping elements between the open and closed positions.

21. The device of claim 20, wherein the manipulable portion comprises a lever.

22. The device of claim 19, wherein the actuator is configured for moving the clamping elements upwardly between the open and closed positions.

23. The device of claim 19, wherein the linkage comprises first and second links, the first link having a first pivot connected to another part of the linkage and a second pivot connected to the second link, the second link having a third pivot connected to another part of the linkage, wherein a line extending between the firsthand second pivots is normally disposed on a first side of the third pivot along the motion between the open and closed positions, the linkage being configured such that said line crosses over the third pivot to the overcenter position of the linkage.

24. The device of claim 19, wherein:
  the first orientation of the one clamping element is substantially displaced from the vertical for receiving the capsule therebetween in an inclined orientation substantially displaced from the vertical; and
  the other orientation is substantially vertical.

25. A device for extracting the contents of a capsule, comprising:

first and second opposing clamping elements movably connected with each other for movement between open and closed positions, wherein:
  in the open position at least one of the clamping elements has a first orientation with respect to the vertical, and the clamping elements are configured and disposed for receiving the capsule therebetween in an orientation corresponding to the first orientation of the one of the clamping elements, and
  in the closed position the clamping elements define an interior cavity therebetween and are configured to cooperatively clamp the capsule between the opposing clamping elements in the interior cavity in another orientation with respect to the vertical;
a fluid port associated with the clamping members and in fluid communication with the interior cavity for receiving fluid into the interior cavity in the closed position; and
a clamping actuator operatively connecting the first and second clamping elements for moving the clamping elements between the open and closed positions, wherein each of the clamping elements has upper and lower ends, and the clamping actuator is configured to move the upper ends towards and away from each other and to move the lower ends towards and away from each other between the open and closed positions.

26. The device of claim 25, wherein:

the first orientation of the one clamping element is substantially displaced from the vertical for receiving the capsule therebetween in an inclined orientation substantially displaced from the vertical; and the other orientation is substantially vertical.

27. A device for extracting the contents of a capsule, comprising:

first and second opposing clamping elements movably connected with each other for movement between open and closed positions, wherein:

in the open position the clamping elements are configured and disposed for receiving the capsule therebetween, and in the closed position the clamping elements define an interior cavity therebetween and are configured to cooperatively clamp the capsule between the opposing clamping elements in the interior cavity;

a fluid port associated with the clamping members and in fluid communication with the interior cavity for receiving fluid into the interior cavity in the closed position; and a clamping actuator operatively connecting the first and second clamping elements for moving the clamping elements between the open and closed positions, wherein the actuator is configured to direct the clamping elements along a first path from the open to the closed position, and along a second path from the closed to the open position.

28. The device of claim 27, wherein:

in the open position at least one of the clamping elements has a first orientation with respect to the vertical and the clamping elements are configured and disposed for receiving the capsule therebetween in an orientation corresponding to the first orientation of said one of the clamping elements; and in the closed position, the clamping elements are configured to cooperatively clamp the capsule in the interior cavity in another orientation with respect to the vertical.

29. A device for extracting the contents of a capsule, comprising:

first and second opposing clamping elements movably connected with each other for movement between open and closed positions, wherein:

in the closed position the clamping elements define therebetween an interior cavity an elongated dimension disposed in an upright orientation which is in a position relative to the first clamping element, the interior cavity having a shallow dimension disposed orthogonally to and being shorter than the elongated dimension, the clamping elements being configured to cooperatively clamp the capsule between the opposing clamping elements in the interior cavity in an upright orientation, and in the open position the elongated dimension in said position relative to the first clamping element is disposed substantially further from the vertical than in the closed position, the clamping elements being configured and disposed for receiving the capsule therebetween with an elongated dimension of the capsule in an inclined orientation substantially displaced from the vertical; and a fluid port associated with the clamping members and in fluid communication with the interior cavity for receiving fluid into the interior cavity in the closed position.

* * * * *

UNITED STATES PATENT AND TRADEMARK OFFICE
CERTIFICATE OF CORRECTION

PATENT NO. : 6,490,966 B2  Page 1 of 1
DATED : December 10, 2002
INVENTOR(S) : Mariller et al.

It is certified that error appears in the above-identified patent and that said Letters Patent is hereby corrected as shown below:

Title page,
Insert the following section:
-- [30]  Foreign Application Priority Data
Nov. 16, 1998   (EP) ...................... 98121745 --.

Item [57], ABSTRACT,
Line 5, change "of the the extraction" to -- of the extraction --, and
Line 9, change "work the the elements." to -- work the elements. --.

Column 8,
Line 55, change "extracting, the" to -- extracting the --.

Column 10,
Line 26, change "firsthand" to -- first and --.

Signed and Sealed this

Twenty-ninth Day of April, 2003

JAMES E. ROGAN
*Director of the United States Patent and Trademark Office*